(12) United States Patent
Liao et al.

(10) Patent No.: US 11,711,705 B2
(45) Date of Patent: Jul. 25, 2023

(54) METHOD AND SYSTEM FOR FORMING A NETWORK OF NETWORK DEVICES

(71) Applicant: LEDVANCE GmbH, Garching bei Munchen (DE)

(72) Inventors: Wuqiang Liao, Shenzhen (CN); Yafen Zhang, Shenzhen (CN); Dengpan Liu, Shenzhen (CN); Heng Li, Shenzhen (CN)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 17/313,416

(22) Filed: May 6, 2021

(65) Prior Publication Data

US 2021/0352495 A1 Nov. 11, 2021

(30) Foreign Application Priority Data

May 6, 2020 (CN) .......................... 202010373980.5

(51) Int. Cl.
*H04W 24/02* (2009.01)
*H05B 47/19* (2020.01)
*H04W 16/18* (2009.01)
*G06F 3/04847* (2022.01)

(52) U.S. Cl.
CPC ........... *H04W 24/02* (2013.01); *H04W 16/18* (2013.01); *H05B 47/19* (2020.01); *G06F 3/04847* (2013.01)

(58) Field of Classification Search
CPC ...... H04W 24/02; H04W 16/18; H05B 47/19; H05B 45/325; G06F 3/04847; Y02B 20/40; H04L 41/24; H04L 41/0853; H04L 41/12; H04L 41/0806; G08C 17/02; H04Q 9/00
See application file for complete search history.

(56) References Cited

U.S. PATENT DOCUMENTS

| 2020/0352013 | A1* | 11/2020 | Hutson | .................. | H05B 45/12 |
| 2020/0394651 | A1* | 12/2020 | Kreder, III | ............. | G06Q 20/02 |
| 2021/0029795 | A1* | 1/2021 | Chaturvedi | ......... | G06F 3/04847 |
| 2022/0070982 | A1* | 3/2022 | Hussell | .................. | H05B 45/20 |
| 2022/0104333 | A1* | 3/2022 | Cooper | .................. | H05B 47/19 |
| 2022/0263340 | A1* | 8/2022 | DeJonge | ................ | H05B 33/02 |

* cited by examiner

*Primary Examiner* — Abdullahi Ahmed
(74) *Attorney, Agent, or Firm* — Hayes Soloway PC (57) ABSTRACT

A method and a system for forming a network of network devices, the method including providing a plurality of network devices in a physical environment, each of the plurality of network devices being controllable by a mobile network module connectable to the network devices. A network configuration device with a memory unit for storing device configuration data connects a mobile network module to the network configuration device. The mobile network module reads out the device configuration data stored in the memory unit of the network configuration device. The mobile network module connects to a network device and configuring the network device, based on the device configuration data.

20 Claims, 4 Drawing Sheets

METHOD AND SYSTEM FOR FORMING A NETWORK OF NETWORK DEVICES

CROSS-REFERENCE TO RELATED APPLICATIONS AND PRIORITY

This patent application claims priority from Chinese Patent Application No. CN 202010373980.5 filed May 6, 2020, which is incorporated by reference herein in its entirety.

TECHNICAL FIELD

The technical field of the present disclosure generally relates to device networks. In particular, the present disclosure relates to a method and a system for forming a device network.

BACKGROUND

There are methods and systems known, which may be used for forming and managing device networks. It is also known that devices may be connected to networks controllable by computers.

Furthermore, in the process of a network formation and operation, it may become necessary that devices join the network and adopt a required application setup for a proper operation within the network. For large networks with a large number of network devices, however, this can be a time-consuming and difficult task.

SUMMARY

An object of the present application is to provide an improved method and system for forming a network.

According to a first aspect of the present disclosure, a method for forming a network of devices, such as lighting devices, is provided. The method comprises providing a plurality of network devices in a physical environment, each of the plurality of network devices being controllable by a mobile network module connectable to the network devices. In the case of lighting devices, the network devices may comprise lamps, luminaires, such as downlights panel lights, or similar. The light engines may be configured to generate light with at least one adjustable light parameter, such as luminous flux, brightness, luminance and/or light correlated color temperature (CCT).

The method further comprises providing a network configuration device with a memory unit for storing device configuration data. A plurality of network configuration devices may be provided for forming the network in the physical environment. The plurality, in the present context, may comprise two or any higher number. The network devices and the network configuration devices may be provided and arranged in the physical environment according to specific requirements. The physical environment may be any environment in which the network devices may be arranged. The physical environment may be an indoor or outdoor area, a building, a part of a building, a production hall, an office, or a residential space.

The method further comprises connecting a mobile network module to the network configuration device and reading out by the mobile network module the device configuration data stored in the memory unit of the network configuration device.

The method also comprises connecting the mobile network module to a network device and configuring the network device based on the device configuration data. Prior to connecting the mobile network module to the network module, the method may comprise disconnecting the mobile network module from the network configuration devices and bringing the mobile network module to the network module.

The network may be a centralized or decentralized security network and the network configuration device may be a coordinator or trust center of the network, configured to grant a network access for network devices, based on an initial trust center link key. The network configuration device may be a pre-configured gateway or a network coordinator with a memory unit for storing the device configuration data and an interface for connecting with the mobile network module.

By using the mobile network module, the network device can be easily configured, based on the device configuration data, without any time-consuming channel scan for network association and establishment of security connections based on security key-exchange, for joining a network. Further, if more than one network is open in the vicinity, the device may be unable to distinguish which network is the one the user wants the device to join. Therefore, the risk of erroneously joining a wrong network, which might be available in the vicinity of the network device.

By repeating these method steps for a plurality of network devices, even large networks with large numbers of network devices can be easily and quickly deployed.

The configuring of the network device may comprise configuring the network devices such that, upon switching on the network device, it automatically joins the network. Thus, by configuring the network devices for automatically joining the network, the network devices become "network-ready" devices able to join the network straight away, upon turning power on, without any additional action.

The method may comprise reading out manufacturer information of the mobile network module by the network configuration device, while the mobile network module and the network configuration device are connected, to verify that the mobile network module is a valid mobile network module, in particular, eligible for joining the network. By verifying, based on the manufacture information, that the mobile network module is a valid mobile network module, it can be ensured that the right mobile network module is used.

The device configuration data may comprise network data, such as network commissioning data, required for the network device to access the network. The network data may comprise data representing PAN-ID (Personal Area Network Identifier), network channel, short address, network security key, and coordinator address. Based on the network data, the network device can be configured to securely join the network.

The device configuration data may comprise device application data for bringing the settings of the mobile network module in accordance with the intended application or operation regime of the network device. Device application data may comprise device number, device name, location (e.g., indoor location), coordinates, group, scene, on/off, level, CCT, etc. Thus, after switching on the network device, the network device can not only automatically join the network, but also start operating according to the intended operation regime, without manually adjusting the settings of the device.

The method may comprise providing the commissioning data to the network configuration device by inputting the commissioning data into a UI (user interface), such as a commissioning UI. Thus, the user can define or modify the commissioning data in order to prevent an unauthorized access to the network.

The method may comprise generating the device configuration data for storing in the memory unit of the network configuration device, based on the layout of the physical environment, such as floor layout. Thus, the network devices can be configured in accordance with the layout or floor plan of the physical environment.

The mobile network module may comprise a wireless communication interface, and the method may comprise receiving control signals over the wireless communication interface for controlling the network devices. The wireless communication interface may be a wireless communication interface based on a standard communication protocol, such as a Zigbee (registered trademark) interface or WiFi (registered trademark) standard. The Zigbee® and WiFi® interfaces are easily available interfaces and provide a reliable communication interface for network devices.

The method may further comprise computing device application data for storing in the memory unit of the network configuration device. The method may comprise providing physical environment data and a model of the physical environment, based on the physical environment data. In the case of lighting devices, the method may further comprise providing light design layout based on the arrangement of the lighting devices in the physical environment and the model of the physical environment. The method may also comprise providing light settings' information and computing device configuration data based on the light design layout and the light settings' information. Thus, the settings of the lighting devices can be brought into accordance with the specific physical environment and the specific light design layout.

The method may further comprise visualizing the current status of the illumination of the physical environment on a UI showing the lighting devices, e.g. as clickable icons or symbols shown on a touchscreen of the UI, and the status of each lighting device, which may appear as a pop-up list upon clicking on the respective lighting device, with settings and work parameters, on the background of the physical environment or room plan.

According to a second aspect, a mobile network module is provided. The mobile network module comprises a processor, a memory unit configured to store device configuration data and instructions executable by the processor. The mobile network module further comprises a connection interface configured to connect the mobile network module to a network configuration device for receiving device configuration data stored in a memory unit of the network configuration device, the connection interface being further configured to connect the mobile network module to a network module of a network device, such as a lighting module of a lighting device, wherein the instructions executable by the processor comprise instructions to configure the network device based on the device configuration data received from the network configuration device. By configuring the network devices for automatically joining the network, the network devices become "network-ready" devices able to join the network straight away, upon turning power on, without any additional action.

The connection interface may comprise one or more standardized plug-connection interfaces, such as USB (Universal Serial Bus) or UART (universal asynchronous receiver-transmitter). USB and UART interfaces are easily available standard serial interfaces suitable for reliable transfer of device configuration data.

The mobile network module may comprise a wireless communication interface configured to establish network communication and receive signals for controlling the lighting devices. The wireless communication interface may be a wireless communication interface based on a standard communication protocol. In some embodiments, the mobile network module is configured a mobile Zigbee (registered trademark) module, with a wireless communication interface configured as a Zigbee® interface.

The mobile network module may comprise a light control interface with a number of independent control channels, for controlling lighting devices. In some embodiments, the mobile network module comprises four control channels for controlling lighting devices such as controllable light engines of the light devices. In some embodiments, the control channels comprise three color channels R, G, and B, standing for basic colors red, green and blue, as well as a channel W for controlling the intensity level of white light generated by the light engine. The control channels R, G, B and W may be configured as PWM (Pulse Width Modulation) control signal channels for PWM-based controlling of color and brightness controllable light engines of light devices. Over the R, G, B and W channels a full color and intensity control of the light engines can be achieved.

According to a further aspect of the present disclosure, a system for forming a network, such as a lighting network, with a plurality of network devices, such as lighting devices, is provided. The system comprises a network configuration device with a memory unit for storing device configuration data and a connection interface configured to connect the network configuration device to a mobile network module of a network device for configuring the network device based on the device configuration data saved in the memory unit of the network configuration device. The system allows to configure network devices based on the device configuration data, without any time-consuming channel scan for network association and establishment of security connections.

The system may comprise a computational unit with a processor and a memory unit configured to store physical environment data, light design layout data and light setting data. The memory unit may be further configured to store instructions readable by the processor to compute device configuration data for configuring lighting devices, based on the physical environment data, light design layout data and the light settings data.

The system may further comprise a user interface (UI) configured to receive user inputs for inputting and/or modifying the physical environmental data, light design layout data and/or light settings data. By inputting and/or modifying the physical environment data, light design layout data and/or lighting settings data, the lighting system can be programmed such that the lighting devices can be configured such that desired light scenario in any physical environment is achieved.

The system may further comprise a UI to display the real light status on the background of the light design layout. The UI may comprise an interactive user interface, configured to control the network devices by selecting respective icons on the UI. In some embodiments, the icons can be activated be selection for manually controlling corresponding network devices, providing a particularly user-friendly control interface. Thus, the user can check the status of each lighting device, intervene, take action and have a full control of the lighting devices.

The UI may be further configured to display diagnostic parameters, indicating the operational state of the network devices. The UI may be configured to display a dashboard showing diagnostic parameters and/or status information of the network. The network status information may comprise status information of individual network devices and/or global status information related to the network as a whole. The status information may comprise health status information of the network. The health status may comprise the ratio of the number of functioning or offline network devices to the total number of the network devices. In the case of luminaires, the status information of network devices may comprise "on/off" status, brightness, color temperature etc. The UI may be configured to display a dashboard showing the energy consumption of the network device, the energy consumption summary of a room or area. The UI may be configured to display a dashboard showing the remaining lifetime of network device. The UI may be configured to display a dashboard showing predictive maintenance data.

In some embodiments, the system also comprises one or more positioning bases deployable in the physical environment and configured to wirelessly communicate with the positioning tag of the location device for providing positioning data. The positioning bases positioned at known positions in the physical environment can provide a reference system for determining the actual locations of the lighting devices and the gateways.

The collecting of the position data with the location device may be based on ultrawideband (UWB) positioning technology. The UWB technology enables an energy-efficient and accurate determination of device position. With the UWB technology, a highly precise determination of the positions of the network devices is possible. In some embodiments, the spatial resolution or the deviation in the position determination is less than 50 cm. This precision is sufficient for many applications. For collecting the position data, other technologies, such as Bluetooth 5.0 (registered trademark) and WiFi (registered trademark), may be used. These technologies are well standardized and readily available for positioning purposes.

BRIEF DESCRIPTION OF THE DRAWINGS

In the following description, details are provided to describe the embodiments of the present specification. It shall be apparent to one skilled in the art, however, that the embodiments may be practiced without such details.

Some parts of the embodiments have similar parts. The similar parts may have same names or similar part numbers. The description of one part applies by reference to another similar part, where appropriate, thereby reducing repetition of text without limiting the disclosure.

DETAILED DESCRIPTION FO THE DRAWINGS

Figure 1:
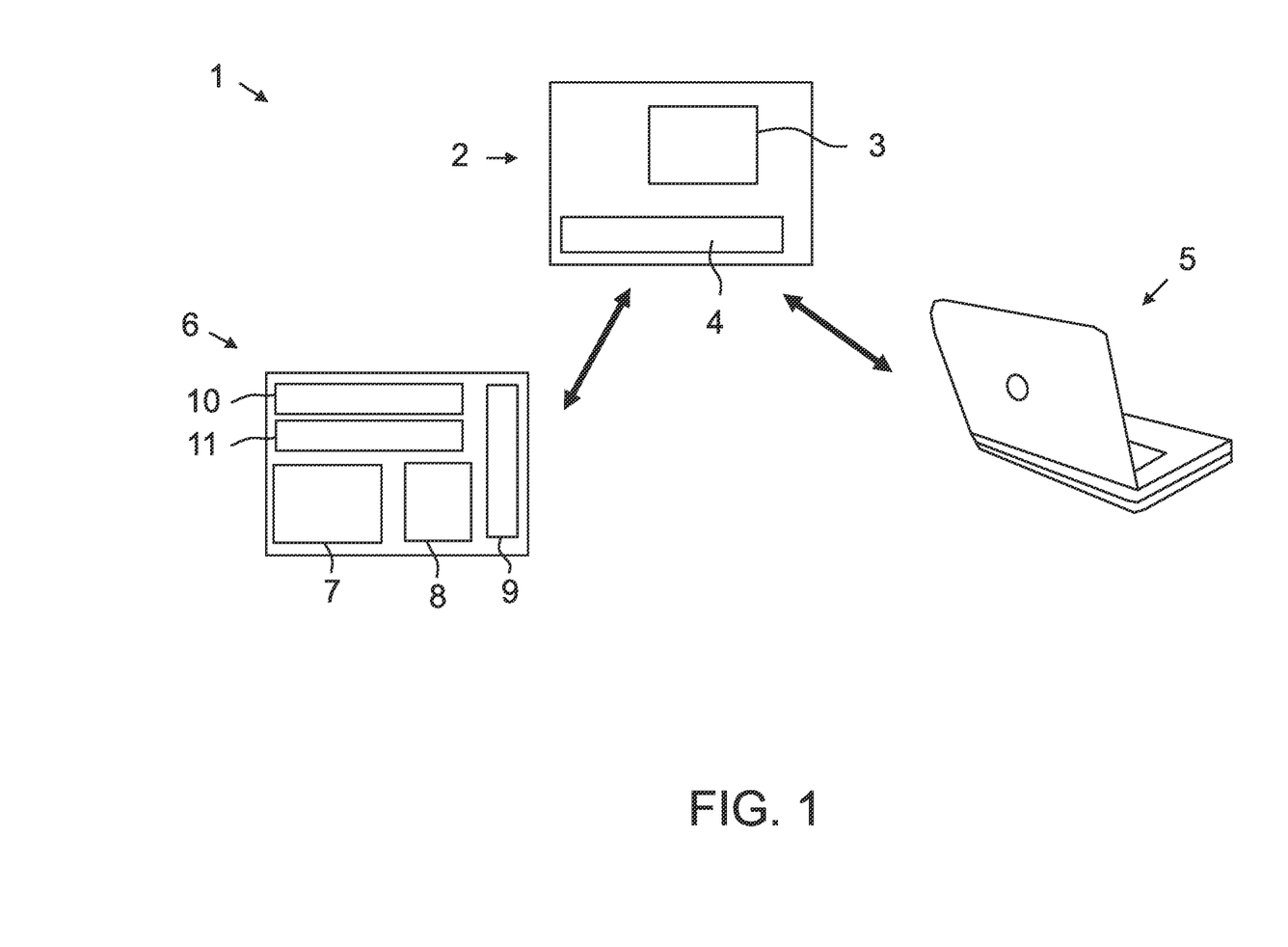
FIG. 1 shows a schematic view of a system for forming a network of lighting devices according to an embodiment of the present disclosure.

FIG. 1 shows a schematic view of a lighting system for forming a network according to an embodiment. The lighting system 1 comprises a network configuration device 2 with a memory unit 3 for storing device configuration data and a connection interface 4 for connecting the network configuration device 2 to mobile network module 6 of a lighting device, such that the mobile network module 6 can be configured based on the device configuration data stored in the memory unit 3 of the network configuration device 2. The system 1 of FIG. 1 also comprises a computational unit or server 5 with a processor (not shown) and a memory unit (not shown) configured to store physical environment data, such as data representing the layout or floor plan of the environment in which the lighting network is to be deployed. The memory unit may be further configured to store light design layout data as well as light settings data and instructions executable by the processor to compute device configuration data for configuring lighting devices, based on the physical environment data, the light design layout data and/or the light settings data. FIG. 1 also shows a mobile network module 6 comprising a memory unit 7 for storing device configuration data, a processor 8, a connection interface 9, a light control interface 10 for controlling a light device and a wireless communication interface 11 configured to establish network communication and receive signals for controlling the lighting devices.

Figure 2:
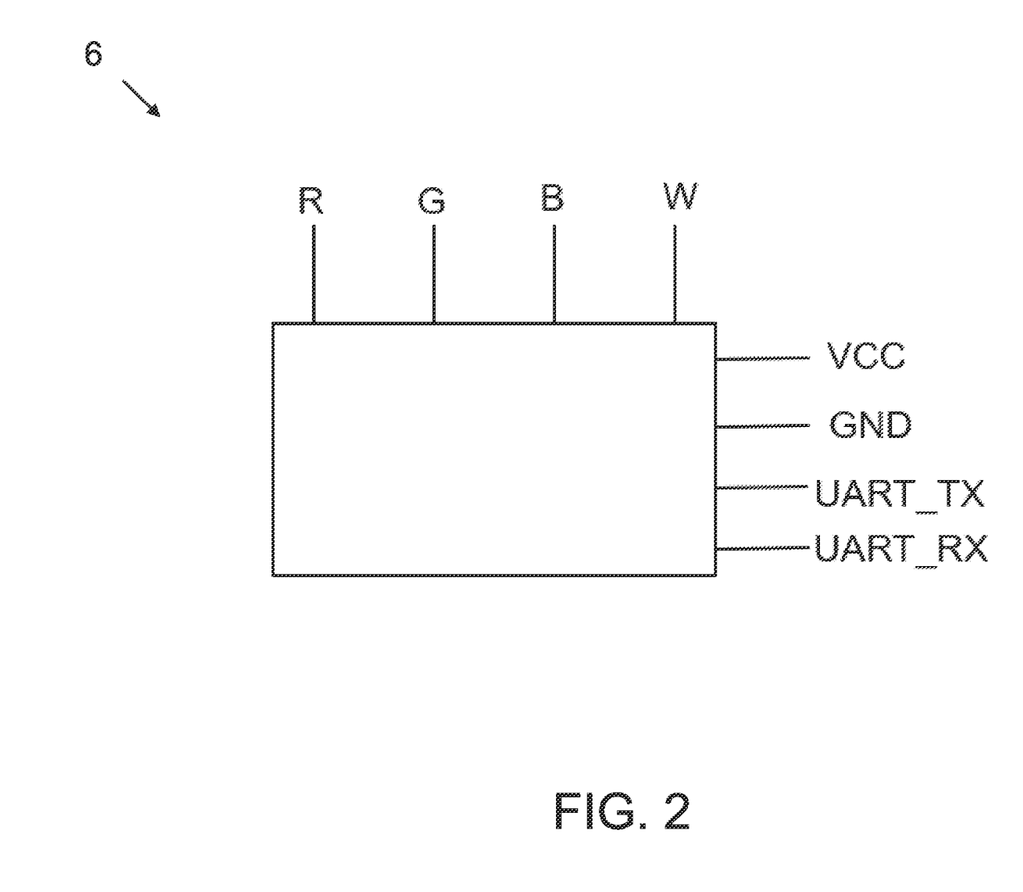
FIG. 2 shows a pinout of a mobile network module according to an embodiment of the present disclosure.

FIG. 2 shows a pinout of a mobile network module 6 according to an embodiment of the present disclosure. In the embodiment of FIG. 2, the mobile network module 6 is configured for controlling a color-controllable lighting device. FIG. 2 shows four control pins or control channels R, B, G and W of the control interface 10 of the mobile network module 6 for controlling a lighting device. The four control channels are configured as PWM (Pulse Width Modulation) control signal channels for PWM-based controlling of color and brightness controllable light engines of light devices. FIG. 2 also shows two data pins, UART_TX and UART_RX, for transmitting and receiving data when connected to a network configuration device 2 or to a lighting device. FIG. 2 also shows two power pins VCC and GND, for power supply of the mobile network module 6.

While the mobile network module 6 is connected to a network configuration device 2 or gateway or network coordinator, the pins VCC, GND, UART_TX and UART_RX may be used, such that the mobile network module 6 can be powered over the pins VCC and GND, while data can be exchanged with the network configuration device 2 over the pins UART_TX and UART_RX. The device configuration data stored in the memory unit 3 of the network configuration device 2 can be received over the pin UART_RX, and data which may be required by the network configuration device 2, such as manufacture information data, can be sent to the network configuration device 2.

While the mobile network module 6 is connected with a lighting device, the pins VCC, GND, UART_TX, UART_RX, R_PWM, G_PWM, B_PWM, W_PWM, may be used, such that the mobile network module 6 can be powered over the pins VCC and GND, while control signals can be sent to the lighting devices over the control pins R, G, B, W and data can be exchanged with the lighting devices over the pins UART_TX and UART_RX.

Figure 3:
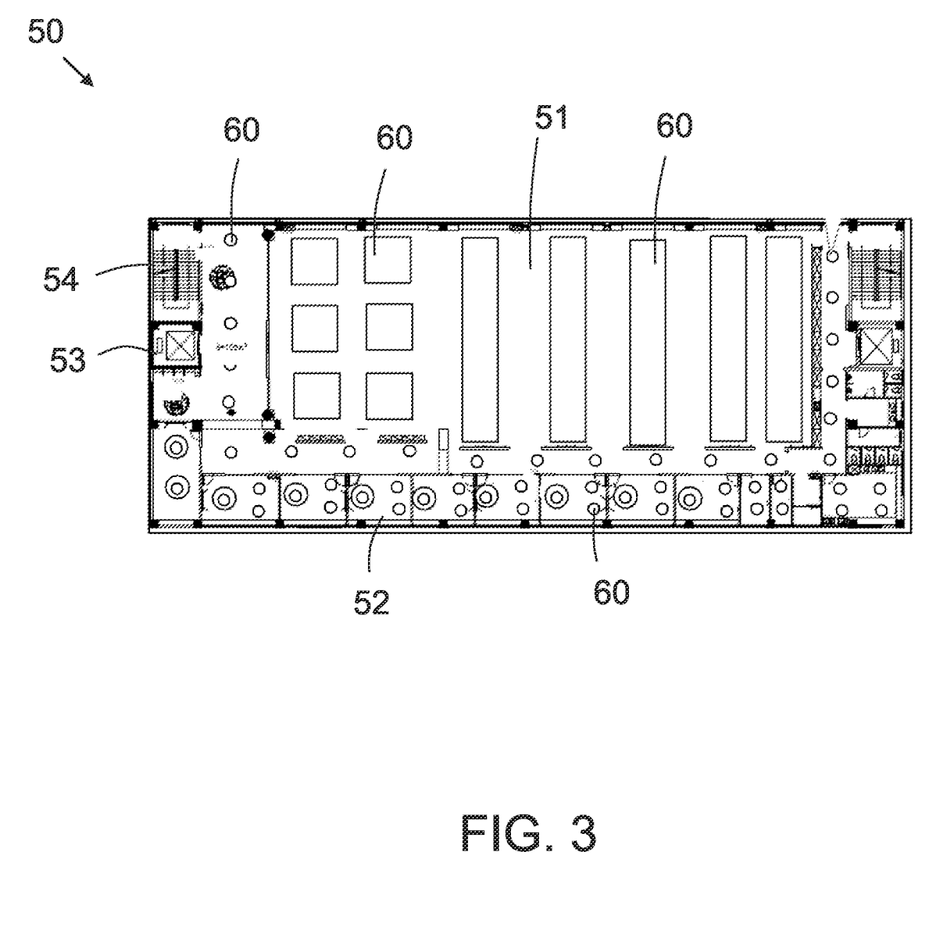
FIG. 3 shows schematically an example of a physical environment with installed lighting devices according to an embodiment of the present disclosure.

FIG. 3 shows schematically an example of a physical environment with installed lighting devices according to an embodiment of the present disclosure. In the example of FIG. 3, the physical environment 50 is a landscaped office, with an open office area 51 as well as a number of smaller rooms 52, elevator shafts 53 and stairways 54. FIG. 3 also shows different kinds of lighting devices 60, including downlights (small circles), and panel lights (rectangles) of different shapes. It is to be mentioned, that the present principles are not limited to landscaped offices and are basically applicable to any kind of physical environment. The landscaped office of FIG. 3 shows illustrates that even complex lighting networks with many different lighting devices can be easily connected to a functional network, by configuring the lighting devices, using the method and system described above.

Figure 4:
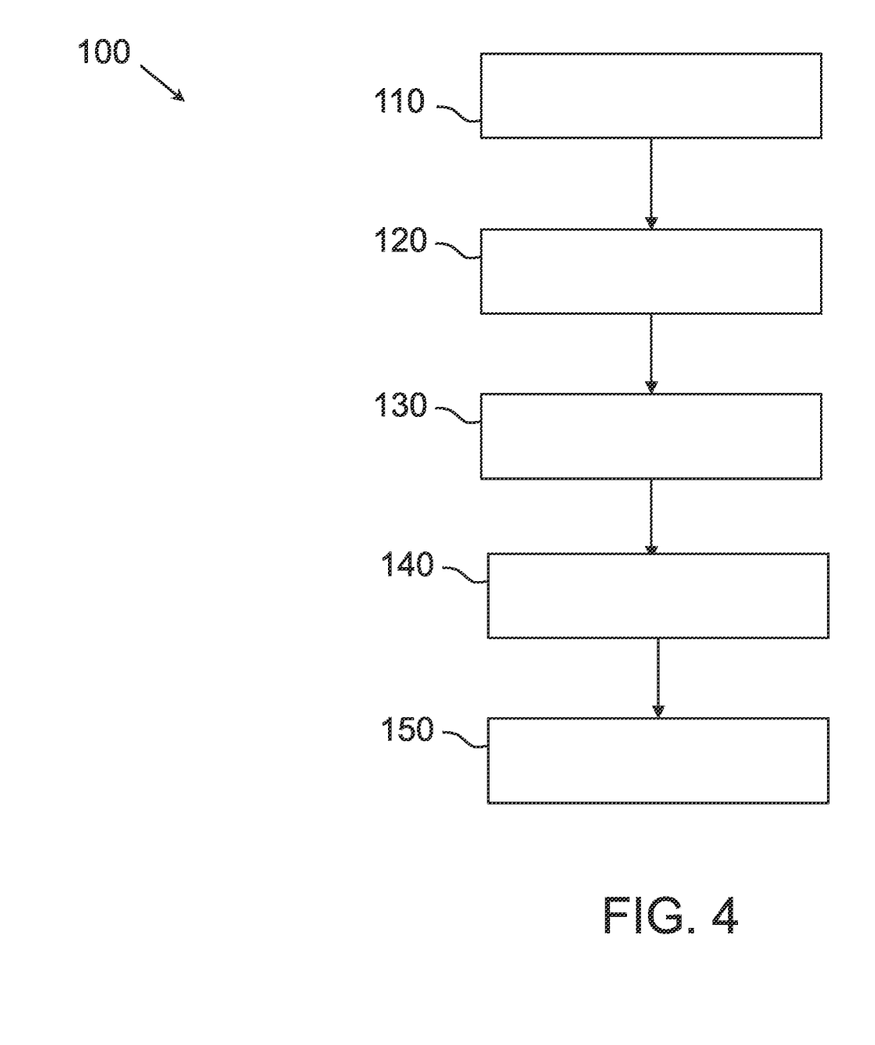
FIG. 4 shows a flow chart of a method for forming a network of lighting devices according to an embodiment of the present disclosure.

FIG. 4 shows a flow chart of a method for forming a network of lighting devices according to an embodiment of the present disclosure. The method 100 forms a network of controllable lighting devices. In step 110, a plurality of network devices, in particular controllable lighting devices 60, is provided in a physical environment 50. Each of the plurality of lighting devices 60 are controllable by a mobile network module 6, according to one of the above-described embodiments, connectable to the lighting devices 60. In step 120, a network configuration device 2 with a memory unit 3 for storing device configuration data is provided. Further, in step 130, a mobile network module 6 is connected to the network configuration device 2. In step 140, the mobile network module 6 reads out the device configuration data from the memory unit 3 of the network configuration device 2.

In step 150, the mobile network module 6 is connected to a lighting device and the lighting is configured based on the device configuration data stored in the memory unit 3 of the network configuration device 2.

By using the mobile network module 6, the lighting device can be easily configured, based on the device configuration data, without any time-consuming channel scan, network association and establishment of security connections based on security key-exchange, for joining a network. Configuring the lighting device may include configuring the lighting device such that upon switching on the lighting device, the lighting device automatically joins the network. Thus, by configuring the network devices for automatically joining the network, the network devices become "network-ready" devices able to join the network straight away, upon turning power on, without any additional action.

After connecting, in step 130, the mobile network module 6 to the network configuration device 2, the network configuration device 2 may read out manufacturer information data of the mobile network module 6, to verify that the mobile network module 6 is a valid mobile network module 6, eligible for reading out the device configuration data.

The method may further comprise retrieving from a database or computing device configuration data for storing in the memory unit 3 of the network configuration device 2.

In some embodiments, the providing the device configuration data comprises providing physical environment data. The providing the device configuration data may further comprise providing a model of the physical environment based on the physical environment data. The method may further comprise light design layout and mapping the lighting devices to the model of the physical environment based on the physical environment data and light design layout. The model of the physical environment may be based on environment data, from which a two-dimensional (2D) or three-dimensional (3D) model of the physical environment can be created. The model may be further a 3D model which is constructed on the basis of a 2D model or floor plan of the physical environment.

The method 100 may further comprise visualizing the current status of the illumination of the physical environment on a UI showing the lighting devices 60 (e.g. as icons) and the status of each lighting devices (e.g. as pop-up) on the background of the physical environment 50 or room plan. The mapping of the network devices to the model of the physical environment can facilitate the identification and control of the network devices by providing an overview of the device positions in the physical environment. The method may comprise creating and/or updating a mapping table with the device information data and the position data of the lighting devices such that mapping table reflects the current locations of the individual lighting devices in the physical environment.

The visualization the lighting devices on the background of the physical environment can provide a clear overview over the locations and status of the lighting devices in the physical environment. In some embodiments, one or more light parameters of the lighting devices, such as luminous flux, brightness, luminance and/or light correlated color temperature (CCT), may be adjusted or equalized in such a way that a desired illumination of the physical environment is achieved.

The device configuration data may comprise network data, such as network commissioning data, required for the network device to access the network. The network data may comprise data representing PAN-ID (Personal Area Network Identifier), network channel, short address, network security key, and coordinator address. Based on the network data, the network device can be configured to securely join the network.

The device configuration data may further comprise device application data for bringing the settings of the mobile network module 6 in accordance with the intended application of the lighting device. Device application data may comprise device number, device name, location (e.g., coordinates relative to the physical environment as a frame reference), group, scene, on/off-status, level, CCT, etc. Thus, after switching on the network device, the network device can not only automatically join the network, but also start operating according to the intended operation regime, without manually adjusting the settings of the device.

In some embodiments, especially in the case of large physical environments like landscaped offices or production halls, the system 1 also may comprise one or more gateways or communication nodes. The gateways may be configured to transfer control signals received from a computer server to individual lighting devices. In some embodiments the gateways may be configured to wirelessly transfer the control signals to the individual lighting devices 60.

In some embodiments, the mobile network module 6 may comprise further components for implementing smart professional systems. Furthermore, the above-described principles are not limited to lighting networks only. It should be appreciated that the network devices may be any kind of networkable devices, which can be configurable in accordance with the above-described principles. Instead or in addition to lighting devices or other kind of network devices, the method described above can be implemented for sensors, enabling a sensor to become a smart sensor. After configuring the mobile network module and plugging it into the sensor, the sensor can join the network and operate by following rules that the system configured for the specific mobile network module.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

The invention claimed is:

1. A method for forming a network of network devices, the method comprising:
providing a plurality of network devices in a physical environment, each of the plurality of network devices being controllable by a mobile network module connectable to the network devices;
providing a network configuration device with a memory unit for storing device configuration data;
connecting a mobile network module to the network configuration device;
reading out by the mobile network module the device configuration data stored in the memory unit of the network configuration device; and
connecting the mobile network module to a network device and configuring the network device based on the device configuration data, wherein the device configuration data are computed based, at least in part, on light design layout data and light settings data.

2. The method according to claim 1, wherein configuring the network device based on the device configuration data comprises:
configuring the network device such that, upon switching on the network device, the network device automatically joins the network.

3. The method according to claim 1, wherein the method further comprises:
reading out manufacturer information data of the mobile network module by the network configuration device, while the mobile network module and the network configuration device are connected, to verify that the mobile network module is a valid mobile network module.

4. The method according to claim 1, wherein the device configuration data comprise network data for the network devices to access the network.

5. The method according to claim 1, wherein the device configuration data comprise device application data for bringing the settings of the mobile network module in accordance with an intended application of the network device.

6. The method according to claim 1, wherein the mobile network module comprises a wireless communication interface, and wherein the method further comprises:
receiving control signals over the wireless communication interface to control the network device.

7. The method according to claim 1, wherein the method further comprises:
providing a model of the physical environment based on a set of physical environment data;
providing the light design layout data;
providing the light settings data; and
computing the device configuration data based, at least in part, on the light design layout data and the light settings data.

8. The method according to claim 1, wherein the light design layout data is based, at least in part, on:
an arrangement of the plurality of network devices in a physical environment; and
a model of the physical environment.

9. The method according to claim 1, wherein at least one of the plurality of network devices is a lamp or a luminaire.

10. The method according to claim 1, further comprising:
displaying, on a user interface (UI), a current status of the plurality of network devices in a physical environment, wherein the current status is displayed on a background of a light design layout that corresponds to the light design layout data.

11. The method according to claim 1, wherein the device configuration data comprise at least one of a personal area network identifier (PANID), a network channel, a short address, a network security key, and a coordinator address.

12. The method according to claim 5, wherein the device application data comprise at least one of device number, device name, location, group, scene, on/off status, level, and correlated color temperature (CCT).

13. A mobile network module for controlling a network device, the mobile network module comprising:
a processor;
a memory unit for storing device configuration data and machine-readable instructions executable by the processor; and
a connection interface configured to connect the mobile network module to a network configuration device for receiving device configuration data stored in a memory unit of the network configuration device, the connection interface being further configured to connect the mobile network module to a network module of a network device;
wherein the device configuration data are computed based, at least in part, on light design layout data and light settings data; and
wherein the machine-readable instructions executable by the processor comprise instructions to configure the network device based on the device configuration data received from the network configuration device.

14. The mobile network module according to claim 13, wherein the mobile network module comprises a wireless communication interface for establishing a network connection and receiving control instructions for controlling network devices.

15. The mobile network module according to claim 13, wherein the mobile network module has a light control interface for controlling the network devices.

16. A system for forming a network with a plurality of network devices in a physical environment, the system comprising:
a network configuration device comprising:
a memory unit for storing device configuration data; and
a connection interface configured to connect the network configuration device to a mobile network module of a network device for configuring the network device based on the device configuration data saved in the memory unit of the network configuration devices;
wherein the device configuration data are computed based, at least in part, on light design layout data and light settings data.

17. The system according to claim 16, wherein the system further comprises:
a computational unit comprising:
a processor; and
a memory unit configured to store physical environment data, the light design layout data, and the light settings data, wherein the memory unit is further configured to store processor-executable instructions for the processor to compute device configuration data for configuring network devices, based on the physical environment data, the light design layout data, and the light settings data.

18. The system according to claim 16, wherein the system is configured for forming a lighting network and the system further comprises a user interface configured to receive user inputs for at least one of inputting and modifying at least one of the physical environmental data, the light design layout data, and the light settings data.

19. The system according to claim 18, wherein the system further comprises a user interface (UI) to display a real light status on a background of a light design layout that corresponds to the light design layout data.

20. The system according to claim 18, comprising a plurality of lighting devices in a physical environment, each of the plurality of lighting devices being controllable by a mobile network module connectable to the plurality of lighting devices and to the network configuration device.

\* \* \* \* \*

UNITED STATES PATENT AND TRADEMARK OFFICE
CERTIFICATE OF CORRECTION

| | | |
|---|---|---|
| PATENT NO. | : 11,711,705 B2 | Page 1 of 1 |
| APPLICATION NO. | : 17/313416 | |
| DATED | : July 25, 2023 | |
| INVENTOR(S) | : Liao et al. | |

It is certified that error appears in the above-identified patent and that said Letters Patent is hereby corrected as shown below:

In the Claims

Column 10, Line 50 Claim 16, "memory unit of the network configuration devices;", remove the –s– in "devices".

Signed and Sealed this
Thirtieth Day of July, 2024

Katherine Kelly Vidal
*Director of the United States Patent and Trademark Office*